US006839742B1

(12) United States Patent
Dyer et al.

(10) Patent No.: US 6,839,742 B1
(45) Date of Patent: Jan. 4, 2005

(54) WORLD WIDE CONTEXTUAL NAVIGATION

(75) Inventors: Bruce Dyer, Meridian, ID (US); Jeroen Van Alphen, Leiden (NL)

(73) Assignee: Hewlett-Packard Development Company, L.P., Houston, TX (US)

( * ) Notice: Subject to any disclaimer, the term of this patent is extended or adjusted under 35 U.S.C. 154(b) by 715 days.

(21) Appl. No.: 09/594,223

(22) Filed: Jun. 14, 2000

(51) Int. Cl.[7] .......................... G06F 15/16; G06F 15/00
(52) U.S. Cl. ....................... 709/217; 709/232; 709/218; 715/536
(58) Field of Search ................................. 709/232, 218, 709/217, 209, 227; 715/536, 513; 707/10

(56) References Cited

U.S. PATENT DOCUMENTS

| | | | | |
|---|---|---|---|---|
| 6,073,143 A | * | 6/2000 | Nishikawa et al. | ......... 715/513 |
| 6,397,253 B1 | * | 5/2002 | Quinlan et al. | ............. 709/227 |
| 6,526,426 B1 | * | 2/2003 | Lakritz | ........................ 715/536 |
| 6,623,529 B1 | * | 9/2003 | Lakritz | ........................ 715/536 |

* cited by examiner

*Primary Examiner*—William A. Cuchlinski, Jr.
*Assistant Examiner*—M Delgado

(57) ABSTRACT

The invention maintains the context, e.g. the user's language and/or the user's country, while the user is navigating through different related sites or pages. The invention stores and maintains the information about the user's origin, language, country and product of interest during the navigation. This information is stored as arguments in the URL. A session application redirects the user into a particular page based on the arguments provided by the referring site or user's site. The application operates by matching the provided arguments against lookup tables that describe what is available on the main site. When a match occurs between the arguments in the URL and the lookup tables, the invention begins a session by storing information in the URL into a cookie that is stored on the user's computer. A navigation application will use the information stored in the cookie to return the user to their home page.

17 Claims, 10 Drawing Sheets

FIG. 2A

FIG. 2D

FIG. 2F

214 http://welcome1.hp.com/country/mx/spa/welcome.html

| HP.com Home | Productos HP | Servicios y Soporte de HP | Compra HP | invent

Bienvenido a
HP Mexico

BÚSQUEDA
ASISTENCIA
Información corporative
Agilent Technologies
Empleo en HP
HP Contigo Microsoft
Windows 2000
Global Launch Partner HP – Ayuda a sus Clientes a Liberar
el poder de Mircosoft Windows 2000

▲ Seleccione otro pais
   Other Countries ▼

Soluciones para:
ⓔ Conecta@hp          ⓔ HP Technology Finance
ⓔ HP Express          ⓔ Novedades ▼Noticias
  ▲ Preparándose para la
    información Digital.
  ▲ Descubre el
    verdadero poder de tu
    impresora
  ▲ Más en...

Drivers
OnlineStores

WORLD WIDE CONTEXTUAL NAVIGATION

TECHNICAL FIELD

This application relates in general to computer networks, and in specific to an arrangement for contextual navigation of Internet web sites.

BACKGROUND

Many world-wide corporations maintain multiple web sites, each associated with a different country. For example, the Hewlett-Packard Company has www.hp.com for the United States, www.hewlettpackard.de for Germany, etc. Also, a main site may have a page or group of pages for different countries, for example http://welcome.hp.com/country/it/ita/welcome.htm is the Hewlett-Packard home page for Italy. Each country site or page maintains their own core content, e.g. pre-sales information, product information, search information, location information, job opportunity information, etc. The core content is typically in the language associated with a particular country. Core content may include, for example, information on products sold in the country of the user. This information is typically presented in the language of the user. Other information, i.e. non-core information may not be provided in the language of the user. For example, technical support information may only be provided in the language of the country of the main site, e.g. English. Moreover, such information may not be located on the web site of the user, but rather located on the main site, e.g. the U.S. site. Thus, a user may find themselves shifted to the main site, which is presenting information in a different language. Note that once at the main site, all information would be delivered in the language of the country of the main site (e.g. English) whether or not such information could be presented in the language of the user.

For example, a German user that is logged on to www.hewlettpackard.de would be able to navigate through out the site and see information in the German language, e.g. HP products available in Germany. The user may desire to see certain information, e.g. support information, regarding a particular product, e.g. a color printer. The information may be located on the German site, in which case, the user would be presented the information in German. If not, then the user would be shifted to the main US site, www.HP.com, whereby the information would be presented to the user in English. If the user can read English, then there is no problem, however many German people cannot, and thus they would not be able to understand the information.

Another problem is that once in the US site, the German user would be navigating around the US site. The user could be viewing a range of products (and their prices) and services which may not be available to a German user. Thus, the German user would be receiving improper information. Once in the US site, the German user may select another product, for which German information is available. However, since the German user made the selection in the US site, the German user would only receive the US information version (in English) and not the German version. This happens because there is no way for the system to know that the user is German, and that German information is available. Thus, even though it is preferable that the German user receives the German information version, the user would receive the US version.

Another problem is that once the German user is in the US site, there is no convenient way for the user to return to the German site. In other words, if the user selects the home button, the user is transferred to the US home page, and not the German home page. The user may select the 'back up' button, which transfers the user to the previous page. However, after navigating on the US site, the user may have to select the button twenty or more times. This is a time consuming process, which wastes network resources.

SUMMARY OF THE INVENTION

Therefore, there is a need in the art for a mechanism to maintain a user's context in their navigation of a web site, and provide information in their language if it is available, and provide a convenient return mechanism for the user.

These and other objects, features and technical advantages are achieved by a system and method which maintains information about a user, specifically, their country and language context, during navigation of different web pages. The information regarding the language and/or country of a user is known as context.

Note that the invention is described in terms of Hewlett Packard (HP) sites and pages. However, this is by way of example only, as other sites and pages could be used.

The invention maintains the context while the user is navigating through different related sites or pages, via functions that store and maintain information about the user's origin, language, country and product of interest. This information is stored as arguments in the URL. A session application, that is located on the main site, redirects the user into a particular page based on the arguments provided by the referring site or user's site. The application operates by matching the provided arguments against lookup tables that describe what is available on the main site. When a match occurs between the arguments in the URL and the lookup tables, the invention begins a session by storing information in the URL into a cookie that is stored on the user's computer. A navigation application will use the information stored in the cookie to return the user to their home page. Note that main site means the main site or a portion of pages on the main site, while user's site means either a site or a portion of pages on the main configured for use by the user (e.g., in the user's context).

The session application or mkSession.cgi, is preferably a common gateway interface program. This application directs a user into the main site based on the arguments provided by the referring site by matching the provided arguments against lookup tables that describe what is available on the main site. These lookup tables are generated and released when the site is built and each time the site is updated. Thus, the tables always reflect what is being offered on the site. If the required item is not available, alternatives are offered, such as "Support in English", "Back where you came from", etc. Arguments to the session application serve one of two possible functions. Some provide information to specify at what level or URL location the user should enter the site, while others provide information on what to do if the user decides to leave the site later on in the session. If the requested item is available, the session application will redirect the user to the appropriate page in the site in such a way that the session manger can read and maintain this information.

The session application or MkSession.cgi is located at http://www.hp.com/cgi-bin/cposupport/loc/mkSession.cgi. An example call to mkSession.cgi is as follows:

http://www.hp.com/cgi-bin/cposupport/loc/mkSession.cgi?LC=DE&CT=DE&PN=C2164A.

Or, as an HTML Form:

```
<FORM ACTION="http://www.hp.com/cgi-bin/cposupport/loc/mkSession.cgi"
    METHOD=POST>
    <INPUT TYPE=HIDDEN NAME=LC VALUE=DE>
    <INPUT TYPE=HIDDEN NAME=CT VALUE=DE>
    <INPUT TYPE=HIDDEN NAME=PN VALUE=C2164A>
    <INPUT TYPE=IMG SRC=yourpic.gif>
</FORM>
```

The session manager is used to maintain the context while navigating through the main site. Note that only portions of the main site may have contextual navigation. The session manager includes a collection of JavaScript functions that store and maintain information about a user's origin, language, country and product of interest. While browsing the main site this information is used to add dynamic navigational elements to "product neutral" pages. Note that any pages that are not single product specific, product navigation pages apply to many products, however the initial product context can be maintained on pages that apply to multiple products. When leaving the main site by clicking one of the standard navigational items, the information contained in the session will be used to redirect the visitor to the most appropriate page on the user's site. The information contained in the session will be carried over from page to page by setting one HTTP cookie named "HPCC_Session" that contains several key-value pairs. Upon loading a new page, the Cookie will be read and the information contained in it will be made available to the JavaScript functions. Besides reading data from the Cookie, the Session Manager functions will also read data provided in the query string of the URL. The following would, for example, set the country code to "Austria":
http://www.hp.com/cposupport/de?CTRYcod=AT.

The session manager introduces session preferences to the Cookie from the mkSession.cgi script that will create sessions starting at any page in the main site. Session manager will also read the "default" hidden values in the HTML form "HPCC_leftNav" that is generated by the build system on every page. These values will align the session data to the content viewed. Data will be added to the session profile as users go deeper into the main site and define their interest more specifically, and it will be removed again as users navigate back towards the top of the site. Note that session manager requires the user to have JavaScript enabled and to accept Cookies. If this is not the case, the sites will still function, but the session will just not be as intelligent as it would be with full session management.

The naviagate application or navigate.CGI is also preferably a CGI application, which permits transfer back to the user's home page or home site in the original context. The navigate application is a Perl5 application that handles contextual navigation links on the main site. The application will make sure that all data from the session profile in the cookie is used to take a visitor to the most appropriate page in the main site, the user's sites, and other related sites. The underlying principle of this application is that to a user "Home" is not necessarily the main site or www.hp.com. Home may be a site or page local to the user, e.g. www.europe.hp.com/go/austria/ or www.hewlett-packard.de. This principle is important as it allows users to easily return to their home page.

The web pages on the main site themselves do not contain URLs for the contextual navigation items. Instead, they contain a "flag" that tells navigate.cgi what the user selected or clicked, e.g. HP Products, Buy HP, etc. Navigate.cgi will receive the "flag" along with the session data of the user. The "flag" will be in local language (note that this is required to make "Alt" tags appear properly). The navigate application will translate the flag into a corresponding universal code word. Compre HP,BUY Donde comprar,PRODBUY are two examples of entries in buttonsLC.txt files. The phrase before the comma is the flag and the second word is the 'universal code word' used to do the lookups in the url lookup file. Note that "BUY,24,http://www.hewlett-packard.ch/deutsch/kaufen.html,Y,DE,CH,any,Any" is an example in the url.txt file. If the session profile can not be read (incompatible browsers, javascript or cookies disabled) navigate.cgi will revert to using the default values submitted by the originating page along with the "flag".

Navigate.cgi will read a list of URLs from a database file and, based on the session data determines the best match. The user is then redirected to the best match. If the best match is not a localized page or contextual page, an intermediate page will be presented to the user to inform the user and give the user an option to go back.

The session application, the session manager, and the navigation application all operate to provide contextual navigation and allow for a user to easily return home.

Therefore, it is a technical advantage of the invention to provide contextual navigation and localized home return using standard website technology such as CGI, Java Script and Cookies, and standard browsers.

It is another technical advantage of the invention to provide contextual naviagation and localized home return by maintaining user information during the session, e.g. country, language, and product. Additional information could allow for additional personalization of the session.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which:

FIGS. 2A–2H are diagrams of a computer screen that depict an internet session using the invention.

DETAILED DESCRIPTION

Figure 1:
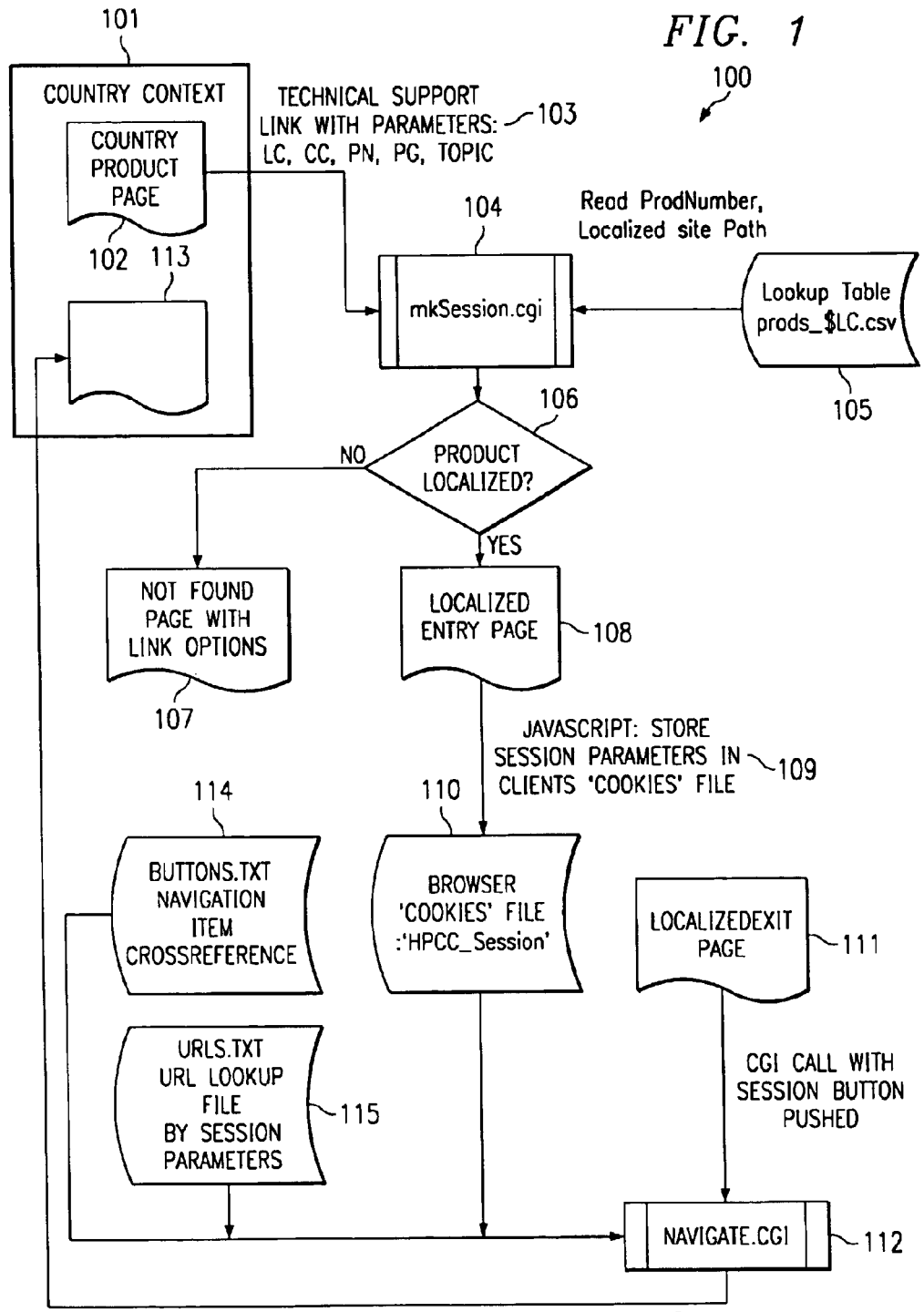
FIG. 1 is a flow chart depicting the operation of the invention, including the session application, the session manager, and the navigation application.

The session application, session manager, and navigation application are first discussed in more detail, after which follows a discussion of FIG. 1, which depicts the interaction of the session application, session manager, and navigation application.

As previously stated, the session application or mkSession.cgi, directs a user into the main site based on the arguments provided by the referring site by matching the provided arguments against lookup tables that describe what is available on the main site. The session application recognizes a language code argument The language code (ISO standard 639-1) (LC) may be a two letter code representing the language of the user, e.g. EN for English, DE for German. Thus, an example would be LC=EN. The session application also recognizes a country code (ISO standard 3166) (CC), may be a two letter code representing the country of the user (or the site being used by the user), e.g. DE for Germany. Thus, an example would be CC=DE. The session application also recognizes a product code (PN), which may be an alpha-numeric number, with each different number representing a particular product, e.g. PN=C264A. Note that if no product code is given, a product group (e.g. printers, scanners, etc.) may be required to enter the site at group level. If both are omitted the site may be entered at the language home page level. The session application also recognizes a product group (PG), which may be an alpha-numeric number or word phrase, with each different number or phrase representing a particular group of similar products, e.g. PG=C21XX, or PG=hp_deskjet_printers. Note that if no product group is given, a product code may be required to enter the site at group level. If both are provided then the product code has precedence. The session application also recognizes a topic code (TOPIC), which is a desired location or information of a user, e.g home, drivers, support documents, etc., for example TOPIC=HOME. The session application also recognizes a custom link text (HT), which can be used to describe the user's home site, e.g. Hewlett-Packard Germany. If custom link text is set, a link with that text will dynamically be written as a feature into the left banner of each page. The session application also recognizes a custom link URL (HU), which can be used to set a link to the home site of the user, for example, HU=http://www.hewlett-packard.de. If a custom link is defined but a URL is not given, the originating page to the session application will be assumed. Both the text and the link for the custom URL need to be HTTP encoded if they are used in a link (i.e space =%20, etc).

If the product is not supported, i.e. the session application could not locate the product in the look up tables, then a page is presented to the user that allows the user to choose from several options. Among the options are going to Product Support in English (which would be handled by main site or hp.com), going to the Service & Support Language Home Page, going to the Custom Link (if defined, using Custom Link Text), and returning back to the to the referring page.

If the topic is not supported, i.e. the session application could not locate the topic in the look up tables then a page is presented to the user that allows the user to choose from several options. Among the options are going to selected product home page, Product Support in English (which would be handled by main site or hp.com) for the selected product, going to the Service & Support Language Home Page, going to the Custom Link (if defined, using Custom Link Text), and returning back to the to the referring page.

As stated previously, the session manager is used to maintain the context while navigating through the main site, and includes a collection of JavaScript functions that store and maintain information about a user's origin, language, country and product of interest.

The session manager uses a browser check and session creation script. This script performs a browser check and invokes the creation of the session object in memory. The session manager supports Netscape, Internet Explorer, and their compatables. This script may be modified to allow for other browsers.

```
<script language=javascript>
    IE4 = (document.all);
    NS4 = (document.layers);
    doSession = (IE4 || NS4);
    if (doSession){ getSession( ) }
</script>
```

The session manager uses the function getSession( ). The getSession( ) function first creates a blank session by invoking mkSession( ). Next, it reads the cookie using getcookie( ), adds possible arguments from the query string of the page to the cookie value and populates the session object by invoking storeData( ) for each key-value pair.

```
function getSession( ){
    mkSession( );
    sstr = getCookie("HPCC_Session");
    sextra = location.search.substring(location.search.indexOf("?")+
1,location.search.length);
    sextra = unescape (sextra);
    sstr += ( sstr ? "+" + sextra : sextra);
    if(sstr == null ) {sstr = "" } pairs = sstr.split("+");
    for (vp=0; vp < pairs.length; vp++){
        pair = pairs[vp].split("=");
        if(pair[1]){ storeData(pair[0],pair[1]) }
    }
}
```

The session manager uses the function mkSession( ) to create the blank Session Array.
It is invoked by getSession( ).
```
function mkSession( ){
    Session = new mkArray( );
    function mkArray( ){ this.size=0; return this; }
}
```

The session manager uses the function storeData( ), which takes a key-value pair as argument and adds that to the session or, if a value for the key is already defined, updates the key with the new value. Submitting a blank value with a key will effectively reset and delete it. storeData( ) is invoked by all functions that write data to the session.

```
Function storeData(Key2Add,Val2Add){
    done = false;
    for (i = 1 ; i >= Session.size ; i++){
        if(Session[i] == Key2Add ){
            Session[Key2Add] = Val2Add; done = true;
        }
    }
    if(! done){
        ++Session.size;
        Session[Session.size] = Key2Add;
        Session[Session[Session.size]] = Val2Add;
    }
}
```

The session manager uses the function storeSession( ), which takes the current state of the session and writes it to the cookie. Keys that had their values reset on the visited page will be removed. storeSession( ) is invoked by an onLoad( ) event in the <BODY> tag of each page. This ensures that the session data is stored as soon as a page is loaded and displayed. storeSession( ) invokes readFromPage( ) to read default values from the current page and add them to the session. It uses setCookie( ) to write the cookie.

```
function storeSession( ) {
    if (Session){
        readFromPage( );
        var expdate = new Date ( );
        expdate.setTime (expdate.getTime( ) + (1000 * 60 * 60 * 24));
        var sstr='';
        for (i = 1 ; i <= Session.size; i++) {
            if(Session[Session[i]]) {
                sstr += Session[i] + '=' + Scssion[Session[i]];
                if(i < Session.size){ sstr+= "+" }
            }
        }
        setCookie("HPCC_Session",sstr,expdate);
    }
}
```

The session manager uses the function readFromPage( ) to read the current page after it has been fully loaded, checks for the existence of certain HTML form fields and reads their values into the session.

```
function readFromPage( ){
    if(document.HPCC_leftNav.LANGcod){
        storeData("LANGcod",document.HPCC_leftNav.LANG-
            cod.value)
    }
    if(document.HPCC_leftNav.PRDcod){
        storeData("PRDcod",document.HPCC_leftNav.PRDcod.value)
    }
    if(document.HPCC_leftNav.PRDtxt){
        storeData("PRDtxt",document.HPCC_leftNav.PRDtxt.value)
    }
    if(document.HPCC_leftNav.PRDurl){
        storeData("PRDurl",document.HPCC_leftNav.PRDurl.value)
    }
    if(documenLHPCC_leftNav.GRPcod){
        storeData("GRPcod",document.HPCC leftNav.GRPcod.value)
    }
    if(document.HPCC_leftNav.GRPtxt){
        storeData("GRPtxt",document.HPCC_leftNav.GRPtxt.value)
    }
    if(document.HPCC_leftNav.GRPurl){
        storeData("GRPurl",document.HPCC_leftNav.GRPurl.value)
    }
    if(document.HPCC_leftNav.DOCtxt){
        storeData("DOCtxt",document.HPCC_leftNav.DOCtxt.value)
    }
    if(document.HPCC_leftNav.DOCurl){
        storeData("DOCurl",document.HPCC_leftNav.DOCurl.value)
    }
}
```

The session manager uses the cookie functions: getCookie & setCookie, which are used to read and store the cookie.

```
function getCookie(name) {
    var dcookie = document.cookie;
    var cname = name + "=";
    var clen = dcookie.length;
    var cbegin = 0;
    while (cbegin < clen) {
```

-continued

```
        var vbegin = cbegin + cname.length;
        if(dcookie.substring(cbegin, vbegin) == cname) {
            var vend = dcookie.indexOf(";", vbegin);
            if(vend == -1) vend = clen;
            return unescape(dcookie.substring(vbegin, vend));
        }
        cbegin = dcookie.indexOf("",cbegin) + 1;
        if(cbegin == 0) break;
    }
    return null;
}
function setCookie(name, value, expires) {
    if (!expires) expires = new Date( );
    document.cookie = name + "=" + escape (value) + "; expires=" +
        expires.toGMTString( ) + ";path=/";
}
```

The session manager has two scripts that use session data. The first is the navigation map JavaScript that uses the data about Product Group, Product and last visited document index to write a navigation menu on product neutral pages, thus establishing links with the previous pages in the session and pages related to those pages.

```
<script langauge=javascript1.2>
<!--
if(Session){
    document.write("<P>");
    if(Session["GRPtxt"] && Session["GRPurl"]){
        document.write( "><A HREF='" + Session["GRPurl"] + "'>"
            + Session["GRPtxt"] + "</A>");
    }
    if(Session["PRDtxt"] && Session["PRDurl"]){
        document.write( " ><A HREF='" + Session["PRDurl"] + "'>"
            + Session["PRDtxt"] + "</A>" );
    }
    if(Session["DOCtxt"] && Session["DOCurl"]){
        document.write( " ><A HREF='" + Session["DOCurl"] + "'>"
            + Session["DOCtxt"] + "</A>" );
    }
}
document.write("</P>");
// -->
</script>
```

The other script of session manager that uses session data is the custom navigation links script that writes a custom link underneath the Standard Navigation Banner. The text (including HTML formatting) and URL for this link are defined by the referring site through mkSession.cgi.

```
<script langauge=javascript1.2>
<!--
if(Session){
    if(Session["HOMEurl") && Session["HOMEtxt"]){
        document.write( "<BR><A HREF='" + Session["HOMEurl"] +
            "'>" + Session["HOMEtxt"] + "</A>" );
    }
}
// -->
</script>
```

As stated previously, the navigate application or navigate.CGI is also preferably a CGI application, which permits transfer back to the user's home page in the original context. This requires navigate.cgi to use a special HTML design for the navigation banners and a database of external URLs.

The contextual navigation on the main site and the local sites is not handled by static, hard-coded links on the pages of the site. Instead, navigate.cgi allows for determining what the user wants and who the user is, based on that, the application can select the most appropriate URL from a list of known alternatives. The navigation banners are not simply cells in a table, but HTML Forms. The navigation buttons are not linked images but HTML Form buttons of the type "Image".

Thus, a navigation banner that is to work with navigate.cgi work requires the following elements:

1) The start of a cell and a table within that cell:

```
<TR><TD valign=top>
<table width="140"
   border="0"
   cellspacing="0"
   cellpadding="0"
   align="LEFT"
   valign="TOP">
```

2) The start of an HTML form named "HPCC_leftNav" with the action set to navigate,cgi, method POST:

```
<form Name=HPCC_leftNav
   action="/~jalphen/cgi-bin/loc/navigate.cgi"
   method="POST">
```

3) A hidden input field with the name of the root directory of the current site: <input=type=hidden name=docRoot value="/~jalphen">

4) Rows and cells containing the elements of the contextual navigation scheme. Instead of using <IMG SRC=...> images are displayed by using <INPUT TYPE=Image SRC=...>. The "Name=" tells navigate.cgi what action is required, but for Netscape also operates when you roll your mouse over the button image, the button Alt=" and Name=" will be displayed in a box the "Alt" tag and therefore has to be in local language:

```
<tr>
   <td width="140" valign="top"><input
   type="Image" name="SUCHEN"
   .src="/~jalphen/de/images/search.gif"
   border="0" vspace="0" hspace="0" ALT="SUCHEN"><br><input
   type="Image" name="WEGWEISER"
   src="/~jalphen/de/images/assist.gif"
   ALT="WEGWEISER" border="0" vspace="0" hspace="0"></TD>
</tr>
```

5) Hidden fields containing default values for the current page (this example is taken from the German DeskJet 660C product home page):
<Input type=hidden name="LANGcod" value="de">
<Input type=hidden name="DOCurl" value=" ">
<Input type=hidden name="PRDurl" value="/cposupport/de/products/hp_deskjet_printers/c2164a/">
<Input type=hidden name="GRPtxt" value="HP DeskJet-Drucker">
<Input type=hidden name="PRDcod" value="c2164a">
<Input type=hidden name="GRPurl" value="/cposupport/de/products/hp_deskjet_printers/">
<Input type=hidden name="DOCtxt" value=" ">
<Input type=hidden name="PRDtxt" value="HP DeskJet 660C-Drucker">
<Input type=hidden name="GRPcod" value="hp_deskjet_printers">

6) The required HTML to end the form, the table and the parent cell:
</form>
</table>
</TD>

The build process knows all the default values as it generates the pages. By including the default values on the page in the form of hidden field elements, and making the buttons form buttons rather than just linked images, ensures that navigate.cgi always has information upon which to base its URL selections.

The possible URLs that can be selected are stored in a table, urls.txt. The table stores the URLs and the criteria that needs to be met for each URL. Each table has the following attributes: a unique numerical Id (e.g. 17), a name for use by administrators (e.g. German desk jet 720 sales page), the URL (e.g. http://www hewlett-packard.de/printer/ink/dj702c.html.), a button that it is associated with (e.g. left slab product information button), is the page in the local language (e.g. Yes or No), languages for which the URL applies (e.g. German), countries for which the site applies (e.g. any, Germany, USA, etc.), product Groups for which the site applies (e.g. any, desk jet printers, etc.), and products for which the site applies (e.g. any, HP ink cartridges). When the site is built, all required data from the table is exported to a CSV file that can be used by navigate.cgi. The extract contains one line per entry in the following format:

BUTTON, Id, URL, Localized?, Language, Country(s), Product Group(s), Product(s). In case of multiple values, these will be included as "embedded CSV". If a value is not specified or required, "Any" will be entered. Values of the session can be used in creating URLs by applying variable substitution. URLs will be parsed, and strings enclosed by #'s will be substituted by their session value. The following, for example, would be a valid entry for "Support Home":

docRoot#/#lc_LANGcod#/

(lc_LANGcod=Language Code value, lowercased)

The navigate application attempts to select the URL that best matches the criteria submitted by the user. If one of the buttons on the page is clicked, the form that holds that button is submitted to navigate.cgi. The navigate application will grab the name of the button clicked and "translate" it into a more universal code name for the buttons. Next the navigate application opens the URLs database and starts reading it line by line. As it reads, it will immediately discard all lines not starting with the button code name, thus creating the first result set. For each line in the result set, navigate.cgi creates an in-memory memory record containing the URL and its attributes. It also creates a hit-counter for each URL. Next, the navigate application steps through the requirements for each URL, Language, Country, Product Group and Product Number and performs a process of elimination and tracking. If the values match, the URL is kept in the result set and the hit-counter is incremented. If the record value is "Any", the URL is kept in the result set but the hit-counter is not incremented. If there is no match and the value is not "Any", the URL is discarded. After testing each requirement, the record set only contains appropriate URLs. Navigate.cgi now sorts the record set on the hit-counter value, highest first. It now takes the first URL from the set to get the best match and redirects the user to it. There should be at least one default in place for each button. If no matching URL is found, the originating page will be returned. If navigate.cgi finds a URL as best match that is not localized, meaning with the same country code and/or language code, it will display an intermediate page, informing the user that the page they are about to view will not be in the local language. The customer will be presented with an option to continue in English or to return to their origin.

Note that the above description of the invention uses the Hewlett-Packard web sites, e.g. www.hp.com, by way of example only, as other web sites could be used. Also, the pseudo code shown above is by way of example only, as other codes could be developed to have similar operations.

FIG. 1 depicts the operation of the invention 100 including the session application, the session manager, and the navigation application. Country context 101 includes web pages 102 written for the country of and in the language of the user, for example a German user is navigating through the German site. At product page 102, the user selects a non-locally supported block, e.g. technical support, which transfers the user to the main site, e.g. www.hp.com (or another site). Encoded in the URL for the local web site maybe the language code, the country code, the product number, the product group, the topic 103, and/or other parameters (or their defaults). Note that topic is by default, the product information home page, however, it could be used to allow the user to select other related information, e.g. hardware and/or software manuals. During site re-direction, these parameters are passed to the session application, mkSession.cgi 104, which resides in the main site. The session application compares the parameters with the information stored in the look-up tables 105. The look-up tables comprise, at a minimum a listing of products and other information, and the languages into which the product information and other information have been expressed or the countries to which the product information and other information is available. The tables also include path information leading to the desired locations in the main site. The look-up tables may be formatted as comma separated value files.

The session application then determines 106 whether the parameters in the web page match information in the look-up tables. The look-up tables could be organized in several ways, for instance the tables may only comprise product and language information, thus a match could occur even though the product is not available in the user's country, because the user's country may have a common language with another country, e.g. U.S.A. and Canada. The look-up tables may comprise product and country information, however a match could occur even though the product information or other information is not in the user's language, because the user's country may have more than one common language, e.g. Canada uses both English and French. The tables could also include both language and country codes as well as product codes. This would provide a determination whether the exact information that the user desires is available.

If there is not a match, meaning that localized content is not available, then the user is presented with a not-found page 107 that includes plural options for the user to proceed. The options could include returning to the previous page, going to an English page of related content (or language of the main site), or going to a different home page. Note that the mismatch could have occurred because no product, no topic, and/or no country/language code was found. Each mis-match could have a different page presented to the user or they could use a common page.

If there is a match, then the user is transferred to the localized entry page 108. The session application, mkSession.cgi, arranges the transfer by using the path information from the look-up tables. The session manager then forms a cookie 109 that includes the parameters 103. The parameters are passed along with the transfer. The cookie is stored in the user's browser file 110 and may be named HPCC_Session. The cookie is storing information about the user's context, e.g. country and language, which will not be lost during navigation of the main site. When the user desires to exit 111, the navigate application 112, navigate.cgi, reads the cookie in the browser 110, and routes the user back to the appropriate local page 113, or home page.

Note that the exit 111 is one of several navigation buttons that a user may select. Pushing any of the buttons invokes the navigation application 112, and allows for contextual navigation of the sites. After selection, the navigation application reads the cookie 109 in the browser 110 to determine the user's context. The navigation application also reads the button file 114 to determine location information associated with the selected button. Based on the information from cookie 109 and file 114, the navigation application searches the URL file 115 to determine the most appropriate location to route the user. The navigate.cgi will then route the user back to the determined location 113. Note that this location is back on the user's local site or pages, and not on the main site.

Figure 2A:
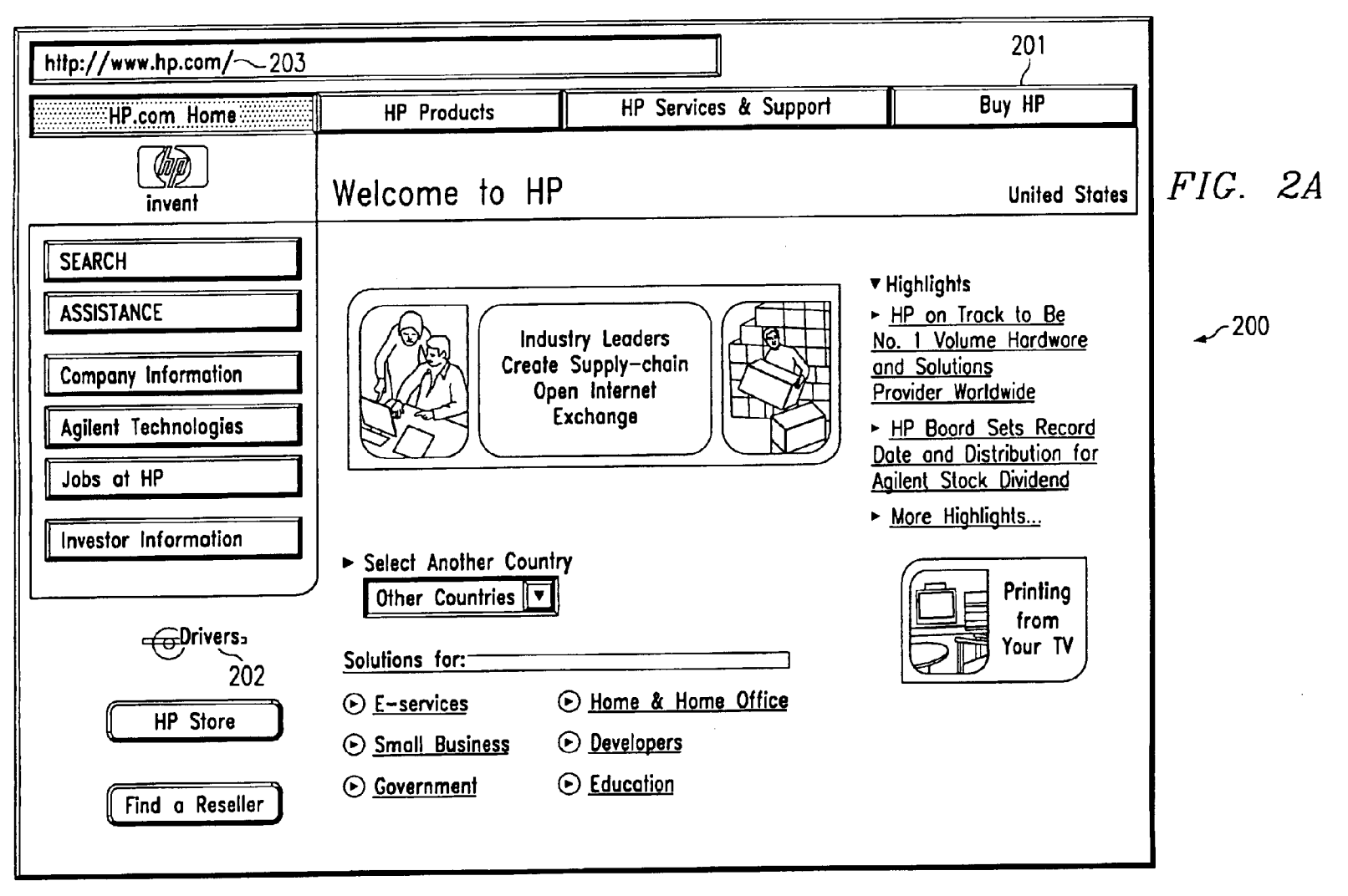
Figure 2B:
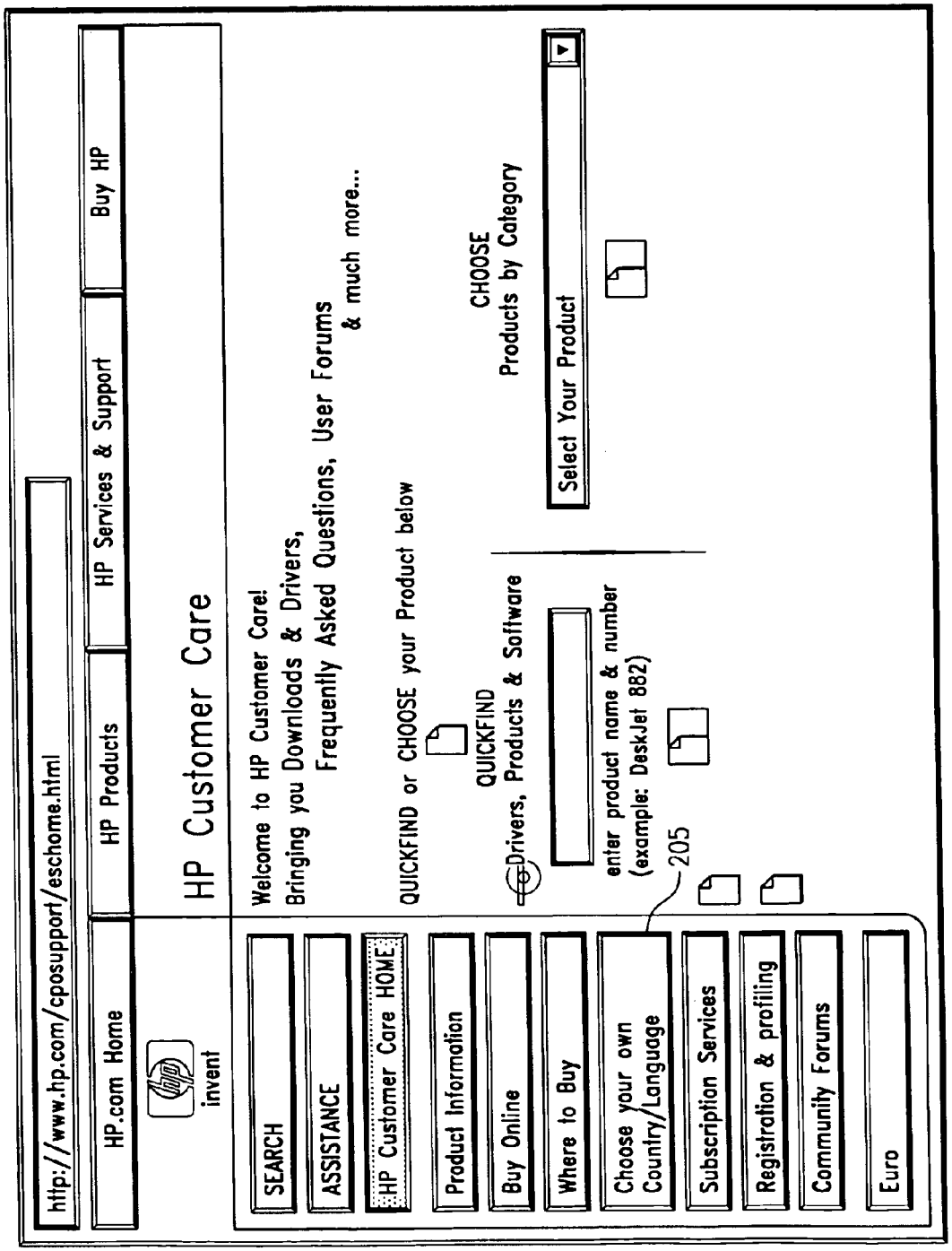
Figure 2D:
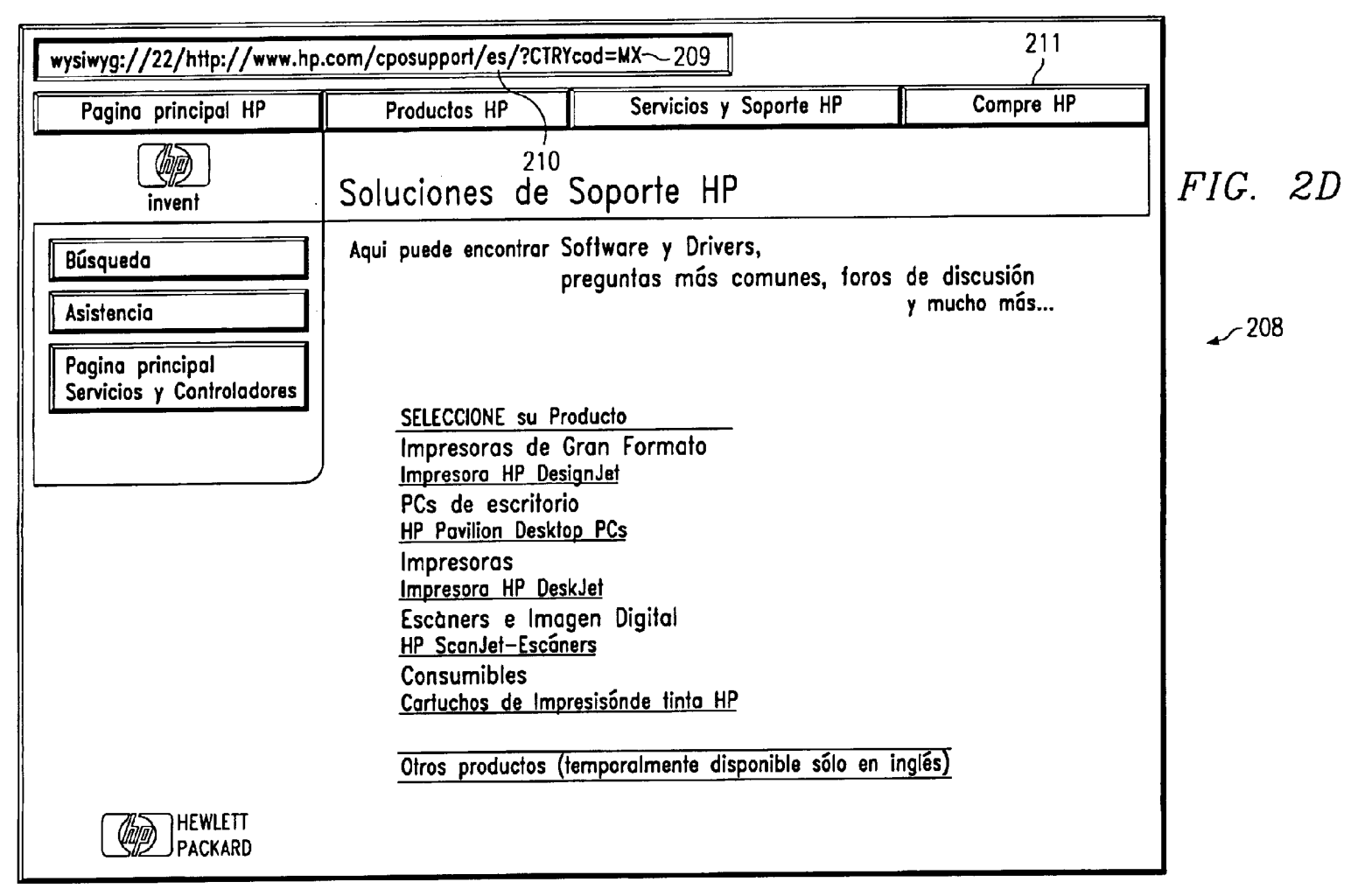
Figure 2G:
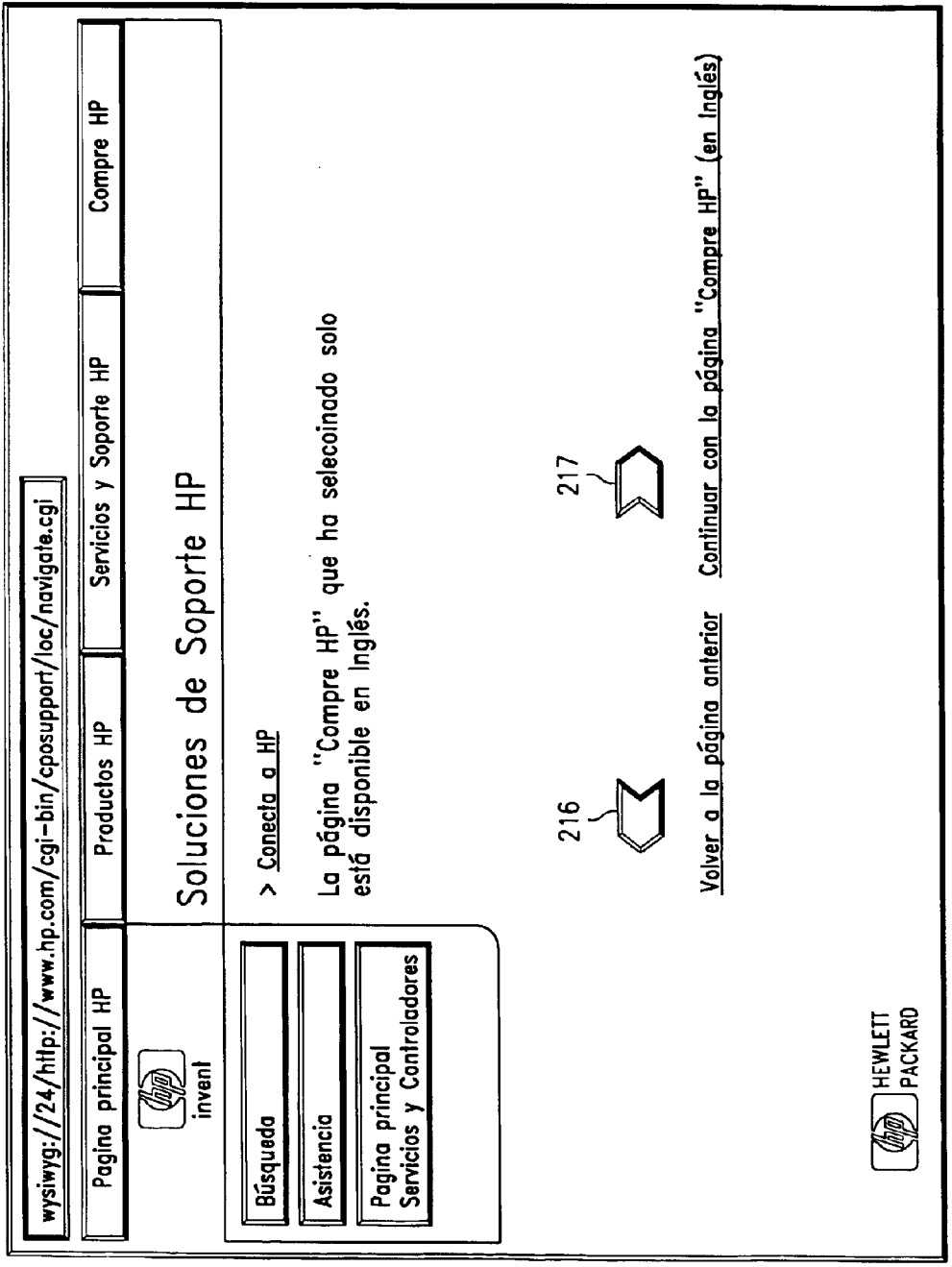

FIGS. 2A–2H show the screens from a computer as used in an Internet session using the invention. In FIG. 2A the screen 200, depicts the home site of Hewlett-Packard. Note that the HP site is used by way of example only, as other sites could be used, and the pages depicted are by way of example only, as other pages could be used. Note that across the top are contextual navigation buttons 201, which are described in the button.txt file 114 of FIG. 1. Pushing or selecting button 202 will transfer the user to screen 204 of FIG. 2B. Pushing button 205 will transfer the user to screen 206 of FIG. 2C. Pushing button 207 will select the language to be Spanish and the country to be Mexico, and will transfer the user to screen 208 of FIG. 2D. Note that the Spanish language is encoded as ES 210 in the URL, and the Mexico country is encoded as MX 209 in the URL. Also note that a cookie is created at this point by the javascript in the page. Further note that the BUY HP button 211 is present, see button 201 of FIG. 1, however button 211 will lead the user to the Mexican sales page, while button 201 will lead the user to the US sales page. Pushing button 211 will lead to screen 212 of FIG. 2E. This invokes the navigation application, navigate.cgi, which in turn reads the buttons file, the URL file and the cookie, and transfers the user to the Mexican store or sales page with the language of Spanish. Pushing button 213 will transfer the user to the Mexican home page, shown as screen 214 in FIG. 2F. FIG. 2G depicts not-found screen 215, wherein the user has the options of returning to the prior screen 216 or continuing with the English version of BUY HP 217. This screen is presented when the navigation application cannot locate an appropriate web page. FIG. 2H depicts not-found screen 218, wherein the user has the options of using English support 219, returning to the Mexican home page 220, returning to where the user came from 221. This screen is present when mkSession.cgi cannot locate an appropriate web 110 page, see element 107.

Figure 3:
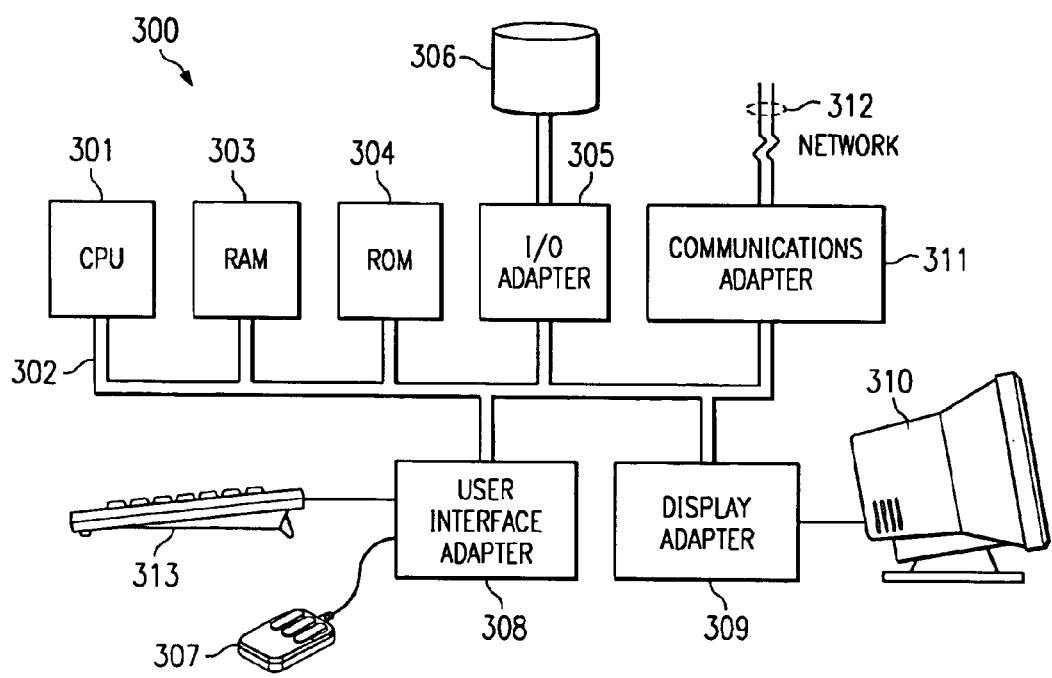
FIG. 3 depicts a block diagram of a computer system which is adapted to use the present invention.

FIG. 3 illustrates computer system 300 adapted to use the present invention. The system 300 could be used as the server for the user, or as the main server. Central processing unit (CPU) 301 is coupled to system bus 302. The CPU 301 may be any general purpose CPU, such as an HP PA-8500 or Intel Pentium processor. However, the present invention is not restricted by the architecture of CPU 301 as long as CPU 301 supports the inventive operations as described herein. Bus 302 is coupled to random access memory (RAM) 303, which may be SRAM, DRAM, or SDRAM. ROM 304 is also coupled to bus 302, which may be PROM, EPROM, or EEPROM. RAM 303 and ROM 304 hold user and system data and programs as is well known in the art.

The bus 302 is also coupled to input/output (I/O) controller card 305, communications adapter card 311, user interface card 308, and display card 309. The I/O card 305 connects to storage devices 306, such as one or more of hard drive, CD drive, floppy disk drive, tape drive, to the computer system. Communications card 311 is adapted to couple the computer system 300 to a network 312, which may be one or more of local (LAN), wide-area (WAN), Ethernet or Internet network. User interface card 308 couples user input devices, such as keyboard 313 and pointing device 307, to the computer system 300. The display card 309 is driven by CPU 301 to control the display on display device 310.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for web navigation comprising the steps of:
providing a first web page in a first context, wherein the first web page is on a first web site;
forming a request to access a second web page, wherein the second web page is on a second web site;
storing context information associated with the first context in a URL of the request;
comparing the URL of the request to a table on the second web site to determine whether the second web page is available in the first context, wherein the table lists web pages available on the second web site, indicates which of the web pages are available in the first context, and provides path information for the web pages;
arranging transfer to the second web page in the first context when the comparing indicates that the second web page is available in the first context; and
after arranging transfer to the second web page, using the context information from the URL of the request to form a cookie to be passed along with the transfer for use in maintaining the first context during further navigation of the second web site;
wherein the first context comprises one of a language, a country, and both a language and a country.

2. The method of claim 1, wherein:
the first web page is located on a first server; and
the second web page is located on the first server.

3. The method of claim 1,
wherein the cookie is stored on a browser.

4. The method of claim 3, further comprising the step of:
forming a request to access a third web page;
wherein the step of forming utilizes the cookie.

5. The method of claim 4, wherein the step of forming comprises the steps of:
reading the context information from the cookie;
reading information from a request file associated with the request to access a third web page;
reading a URL file that includes a plurality of URLs; and
selecting a URL from the URL file based on the context information from the cookie and the information from the request file.

6. The method of claim 5, further comprising the step of:
providing the third web page associated with the selected URL.

7. The method of claim 1, wherein when the step of comparing indicates that the second web page is not available in the first context, the method further comprises:
providing a third web page presenting redirection options including returning to the second web page and going to a page of related content to be provided in a second context.

8. A computer program product having a computer readable medium having computer program logic recorded thereon for web navigation, the computer program product comprising:
code for providing a first web page in a first context, wherein the first web page is located on a first web site;
code for forming a request to access a second web page, wherein the second web page is located on a second web site;
code for storing context information associated with the first context in a URL of the request;
code for comparing the context information stored in the URL of the request with information stored in a table, wherein the information stored in the table includes a list of product information available on the second web site, languages in which the product information is available, and path information for accessing the product information in each of the languages; and
code for processing the request while maintaining the context information;
wherein the first context comprises one of a language, a country, and both a language and a country.

9. The computer program product of claim 8, further comprising:
code for creating a cookie from the URL that includes the context information;
wherein the cookie is stored on a browser.

10. The computer program product of claim 9, further comprising:
code for forming a request to access a third web page;
wherein the step of forming utilizes the cookie.

11. The computer program product of claim 10, wherein the code for forming comprises:
code for reading the context information from the cookie;
code for reading information from a request file associated with the request to access a third web page;
code for reading a URL file that includes a plurality of URLs; and
code for selecting a URL from the URL file based on the context information from the cookie and the information from the request file.

12. The computer program product of claim 8, wherein the code for comparing results in a match, the code for processing further comprises:

code for providing the second web page;

wherein the second web page is in the first context.

13. A method for web navigation comprising the steps of:

providing a first web page in a first context, wherein the first web page is located on a first server;

forming a request to access a second web page wherein the second web page is located on a second server;

storing context information associated with the first context in a URL of the request;

storing product of interest formation associated with the first context in the URL of the request; and processing the request while maintaining the context information;

wherein the first context comprises one of a language, a country, and both a language and a country.

14. The method of claim 13, further comprising the step of:

creating a cookie from the URL that includes the context information;

wherein the cookie is stored on a browser.

15. The method of claim 14, further comprising the step of:

forming a request to access a third web page;

wherein the step of forming utilizes the cookie.

16. The method of claim 15, wherein the step of forming comprises the steps of:

reading the context information from the cookie;

reading information from a request file associated with the request to access a third web page;

reading a URL file that includes a plurality of URLs; and selecting a URL from the URL file based on the context information from the cookie and the information from the request file.

17. A method for web navigation comprising the steps of:

accessing a first web page in a first context, wherein the first web page is located on a first web site;

after accessing the first web page, forming a request to access information which is unavailable on the first web site causing re-direction to a second web site;

storing context information associated with the first context as arguments in a URL of the request;

passing the context information stored as the arguments in the URL of the request to the second web site during site re-direction; and determining whether the requested information is available in the first context on the second web site by comparing the arguments in the URL of the request to a table on the second web site which lists information available on the second web site, indicates which of the information is available in the first context, and provides path information for locating the information;

arranging transfer to a localized entry page in the first context when the determining indicates that the requested information is available in the first context on the second web site; and after the arranging transfer, using the context information associated with the first context in the URL of the request to form a cookie to be passed along with the transfer for use in maintaining the first context during further navigation of the second web site.

* * * * *

UNITED STATES PATENT AND TRADEMARK OFFICE
CERTIFICATE OF CORRECTION

PATENT NO. : 6,839,742 B1
DATED : January 4, 2005
INVENTOR(S) : Dyer et al.

It is certified that error appears in the above-identified patent and that said Letters Patent is hereby corrected as shown below:

Column 15,
Line 14, delete "formation" and insert therefor -- information --.

Signed and Sealed this

Twenty-eighth Day of June, 2005

JON W. DUDAS
*Director of the United States Patent and Trademark Office*